United States Patent [19]
Weibel et al.

[11] Patent Number: 5,527,107
[45] Date of Patent: Jun. 18, 1996

[54] PLANT FOR CONTINUOUS MIXING AND HOMGENIZATION

[75] Inventors: Roman Weibel, Oberuzwil; Bruno Gmuer, St. Gallen; Peter Naef, Heiden, all of Switzerland

[73] Assignee: Buehler AG, Switzerland

[21] Appl. No.: 375,169

[22] Filed: Jan. 18, 1995

Related U.S. Application Data

[63] Continuation of Ser. No. 156,410, filed as PCT/CH91/00023 Jan. 29, 1991 published as WO91/11690 Aug. 8, 1991, abandoned, which is a continuation of Ser. No. 768,640, Dec. 2, 1991, abandoned.

[30] Foreign Application Priority Data

Feb. 2, 1990 [CH] Switzerland ................. 349/90

[51] Int. Cl.$^6$ .................................. B01F 15/04
[52] U.S. Cl. .................... 366/141; 366/154.1; 366/156.2
[58] Field of Search .................. 366/141, 18, 152.1, 366/156.2, 160, 341, 152.2, 151.1, 154.1; 222/57, 77; 177/58, 104

[56] References Cited

U.S. PATENT DOCUMENTS

| | | | |
|---|---|---|---|
| 4,272,824 | 6/1981 | Lewinger et al. | 222/77 |
| 4,459,028 | 7/1984 | Bruder et al. | 366/141 |
| 4,469,147 | 9/1984 | Durant | 141/83 |
| 4,498,783 | 2/1985 | Rudolph | 366/141 |
| 4,667,503 | 5/1987 | Loos | 366/141 |
| 4,801,210 | 1/1989 | Gian | 366/156 |

FOREIGN PATENT DOCUMENTS

| | | | |
|---|---|---|---|
| 0170322 | of 0000 | European Pat. Off. | |
| 2384246 | of 0000 | France | |
| 3708282 | of 0000 | Germany | |
| 3219910 | of 0000 | Germany | |
| 2034837 | 7/1970 | Germany | 366/141 |
| 1905201 | 8/1970 | Germany | 366/18 |
| 2247518 | 4/1974 | Germany | |
| 3126086 | 1/1983 | Germany | 366/18 |
| 0150530 | 8/1984 | Japan | 366/141 |
| 1137963 | 5/1989 | Japan | 366/141 |
| 0548766 | 8/1975 | U.S.S.R. | 222/57 |
| 8605874 | of 0000 | WIPO | |

*Primary Examiner*—David Scherbel
*Assistant Examiner*—Tony G. Soohoo
*Attorney, Agent, or Firm*—Finnegan, Henderson, Farabow, Garrett & Dunner

[57] ABSTRACT

The new invention is directed to a continuous mixing and homogenizing plant, particularly for mill products. In so doing, the simultaneity of the mixing of all raw components in a pre-mixing space 8 is ensured in particular, so that subsequent continuous homogenization is also possible so as to meet the strictest demands. The utilized component weigher 4 and the assigned screw discharge 25 are constructed so as to be substantially tubular and together form a differential flow regulator 6. The inner surface of the entire system contacted by the product is accordingly tubular and is subjected to a continuous self-cleaning as a result of the movement of the product. Further, it is possible to arrange a plurality of component weighers 4 in a geometrically identical manner with respect to a collecting point 17 and a very high quality of mixing is obtained.

5 Claims, 7 Drawing Sheets

PLANT FOR CONTINUOUS MIXING AND HOMGENIZATION

This application is a continuation, of application Ser. No. 08/156,410, filed as PCT/CH9100023 Jan. 29, 1991 published as WO91/11690 Aug. 8, 1991 now abandoned, which is a continuation of application Ser. No. 97/768,640, filed Dec. 2, 1991, now abandoned.

FIELD OF THE INVENTION

The invention is directed to a plant for mixing and homogenizing pourable materials to be ground comprising a plurality of continuously operating component metering weighers.

BACKGROUND ART

Formerly, in order to mix and homogenize pourable materials to be ground, particularly raw components for the foodstuff and feedstuff industries. the so-called batch mixer was used almost exclusively. These batch mixers enable a thorough mixing and a high degree of homogeneity with respect to all raw components, even the smallest, e.g. for the production of a baking mixture. In practice, there are a great number of concepts having particular characteristics depending on the technical field. In the simplest solution, the batch mixer is constructed simultaneously as a hopper scale. The required raw components are weighed in one after the other, according to a predetermined recipe, by means of the weight signals and are subsequently homogenized with the mixing tools comprehending the entire batch container. The homogeneity can be controlled advantageously in this instance by means of a suitable construction of the mixing tools and optimal time period. However, there are two fundamental disadvantages to this solution. Firstly, a discontinuous operation results from the sharp separation of work cycles:

metering—weighing mixing—homogenization discharging

Secondly, the volume of the batch mixer, e.g. one to two cubic meters, and the time required for a mixing and homogenizing cycle determines the quantity which can be mixed per hour. Strict limits are accordingly imposed on increases in output.

Attempts have been made to reduce these disadvantages in various ways, e.g. in that at least a portion of the raw components are added simultaneously by means of metering weighers. A genuine increase in output can accordingly be achieved by using a preliminary container weigher in which a new mixture is prepared completely according to the recipe during the homogenization process and can be discharged into the batch mixer within several second. Moreover, the time required for discharging can be shortened when a secondary container of the same proportions as the batch mixer is arranged subsequent to the latter, an entire batch being discharged into the secondary container in each instance. A continuous product flow can thus be delivered from the secondary container via discharging elements. Thus, a high construction cost is required for the continuous delivery of a homogenized product with high hourly output, since a certain overall height or building height is required in order to arrange the three containers one below the other so that the transfer of product can be effected by means of gravity. If product mixtures which are processed one after the other may not be contaminated or if very strict demands are made with respect to hygiene, a thorough cleaning must be performed periodically and certain residues must be removed from the containers, if necessary, after every change of mixture.

Recently, in order to reduce these disadvantages somewhat, continuous systems have been used to an increasing extent. Solutions with belt weighers are known. So far, it has not been possible for this system to prevail in a broader market or to partially displace the batch mixer. Hygiene could be improved only in part. The homogeneity is not as good as in the batch mixer in every case, but in particular the investment cost for belt weighers is considerable in many cases. Simple metering elements such as those used for liquids or for freely flowing grain product cannot be used because of the poor flowing properties of at least a portion of the components or materials to be ground.

OBJECT AND SUMMARY

The object of the invention is to eliminate the known disadvantages, particularly to deliver the homogenized product in a continuous manner and also to enable very high throughput capacities with a high degree of homogeneity with respect to all product components.

The solution, according to the invention, is characterized in that the mixing and homogenizing plant comprises a pre-mixing space for the simultaneous, continuous mixing together of the individual components from the component metering weighers.

Only the new invention shows with great clarity that the entire scope of operations, e.g. also the product path to the pre-mixing space, is of great importance for the overall results when the strictest demands are made with respect to adherence to the recipe with a plurality of components and with respect to the homogenization. In addition to the precision of every individual device, not only must the technical interaction be kept under control, but the relative operation with respect to time is also very important for a good end result. This fact has been overlooked in the past.

It is particularly preferable that at least a part of the component metering weighers be constructed as differential flow regulators, wherein the latter are constructed as tube weighers having a tubular cross section and a screw-type discharge for all product components having poor flow properties, e.g. flour-like or flake-type product components. However, for the mixing of flour and semolina, the freely flowing semolina can be added in a metered manner by means of simply conceived differential flow regulators comprising slides or flap control and the flour can be added in a metered manner by means of a differential flow regulator comprising a screw-type discharge.

In a further development of the inventive idea, a plurality of component metering weighers can be arranged a geometrically similar arrangement directly on a common collecting point or can be arranged in a geometrically similar manner relative to the pre-mixing space, so that the distances between the end of the discharge of all component metering weighers and a common collecting point are approximately equal. This solution completely eliminates a former weak point in the continuous homogenization of difficult materials to be ground. It has been recognized that a continuous mixing and homogenization requires that all individual components be fed in simultaneously. The use of tube weighers with tube screw conveyors as discharge means in the differential flow measuring principle in particular also allows a genuine simultaneous feed of raw components which are difficult to meter, e.g. bran, break, or flour with a high fat content, so that no disturbances or uncontrollable mixing flows occur at the start, during operation or at the end of a mixing task.

The weighing time can be reduced virtually to zero with the differential flow measuring principle, since it is effected at the continuous product flow with very great precision and weighing accuracy. The unifying of product flows is ideal and is effected in the same way as when coffee is poured into a cup with one hand and milk is poured into a cup simultaneously with the other hand in order to make a cup of cafe-au-lait. The tubular cross section of a tube weigher, in the same way as the tube screw conveyor, allows product to flow through the entire cross section in the particularly problematic interior of the weigher. As a result, the product actively brushes over substantially all inner surfaces during normal operation and a self-cleaning action is accordingly effected. No product can adhere to or remain lying on any location. Virtually no residues, which pose a known problem in foodstuff processing, can occur. A total emptying of all elements can be provided in each instance after every change of product by means of corresponding programming of the entire control unit.

The component metering weighers preferably open horizontally into a collecting hopper or pre-mixing space, respectively, with a direct transfer of the material into a homogenizer, so that the quantities discharged by the tube screw conveyors of the component metering weighers converge directly in a common collecting point. The results can be further improved if the construction design for the product transfer from the tube screw conveyor to the collecting hopper is effected in such a way that a stronger product flow does not displace weaker product flows to one side, when, rather, an immediate mixture is effected.

For many mixing tasks, additives must be mixed in in very minimal proportions in addition to the mixing of two, three or more main raw components. One or more micro-differential metering weighers can be used for this purpose. Further, it is preferable if a quantity of component metering weighers are arranged circularly and approximately at the same height relative to a collecting point, wherein the component metering weighers are arranged in an outer circular ring and a plurality of micro-component weighers, if necessary, are arranged within the circular ring. The great advantage of the new solution consists in that the individual mixing proportions are formed immediately before combination and are combined immediately before or shortly before the homogenization. The requirement for the simultaneous combination of all mixing components can thus be ensured at the same time. A basic precondition for the strictest requirements with respect to adherence to the recipe, mixing, and homogenization is accordingly fulfilled.

A further, particularly advantageous construction is characterized in that the pre-mixing space and homogenizer form a constructional unit, wherein the homogenizer operates in a continuous manner. Accordingly, it could be shown once again that the long dispute between two technical solutions often only consists in an exaggerated stubbornness of both respective advocates and producers of two pure concepts and that by adopting only one formulation of the other solution unexpected advances can be brought about. The mixing of a plurality of components implies nothing more than simultaneity of the mixing, neither with respect to a determined quantity, e.g. a sample quantity, nor with respect to a mixing constant over a long period of time during continuous mixing. For this reason, the homogeneity or homogenizing is additionally prolonged in mixing performed in mills. Because of the many possible disturbing factors, only the batch mixer system has so far been credited with a guarantee of complete homogeneity, in an identification, as it were, with the manner of thinking of a person accustomed to scientific laboratory work. The small laboratory mixer was adopted on a large scale at the price of a discontinuous, costly working process.

A controllable product return from the outlet of the homogenizer into the pre-mixing space is preferably suggested, so that a recirculation of the product to be mixed from the pre-mixing space—homogenizer—pre-mixing space, etc. is possible, e.g. when starting a mixing during disturbances or at the end of a selectable quantity and/or over a selectable time period. Since the product can only move forward in a classic homogenizer, there is only a transverse mixing (as seen in the direction of flow). However, a longitudinal mixing can now be compelled in a novel manner.

It is particularly advantageous if the pre-mixing space and homogenizer form a constructional unit and if the latter is conceived as a continuously working pneumatic homogenizer which can comprise a central outlet tube. An adjustable base outlet is preferably formed in the base area of the central outlet tube, so that this adjustable base outlet is controllable via computing means and/or qualitative sensor means on the basis of qualitative values such as moisture, brightness, protein, crude fiber, etc. In a further development of the inventive idea, the homogenizer can also be constructed as a mechanical vertical conveyor with homogenizing elements, that is, with a lifting function and with a controllable return movement into the pre-mixing space. The vertical conveyor is preferably arranged above a controllable base outlet of the pre-mixing space.

With very strict demands on the homogeneity of the final product, pneumatically operating means or mechanical mixing tools can be arranged in the pre-mixing space. In so doing, controllable product discharge means are to be assigned to the vertical conveyor for controlling the product discharge and product return. In any case, it is suggested for automatically operating plants to arrange a measuring and monitoring device at the outlet of the homogenizer for qualitative product parameters. For special applications, e.g. for feedstuff mixtures, a product mixing and holding station can be arranged for the product subsequent to the homogenizer, a product circulating conveyor preferably being assigned to the latter.

Most products which are sometimes considered difficult can be successfully processed and mixed with the new invention. Depending on the application, this is a matter of different qualities of flours, semolina, middlings, bran, etc. and ingredients such as dry gluten, coloring, vitamin C, calcium, phosphate, powdered egg, salt, baking powder, etc. or corresponding feed components for feedstuff. However, instantaneous weight signals for the metering of water or other liquid components can also be made used of.

Further, the new invention makes it possible simultaneously to control directly the metered addition of water and egg soup or, e.g. liquids, for special mixing tasks, e.g. mixing for pasta or broth production—since instantaneous values of throughput per hour unit can be determined at all times with very great precision. For a better understanding of the present invention, reference is made to the following description and accompanying drawings while the scope of the invention will be pointed out in the appended claims.

DESCRIPTION OF THE PREFERRED EMBODIMENTS AND BEST MODE

Figure 1:
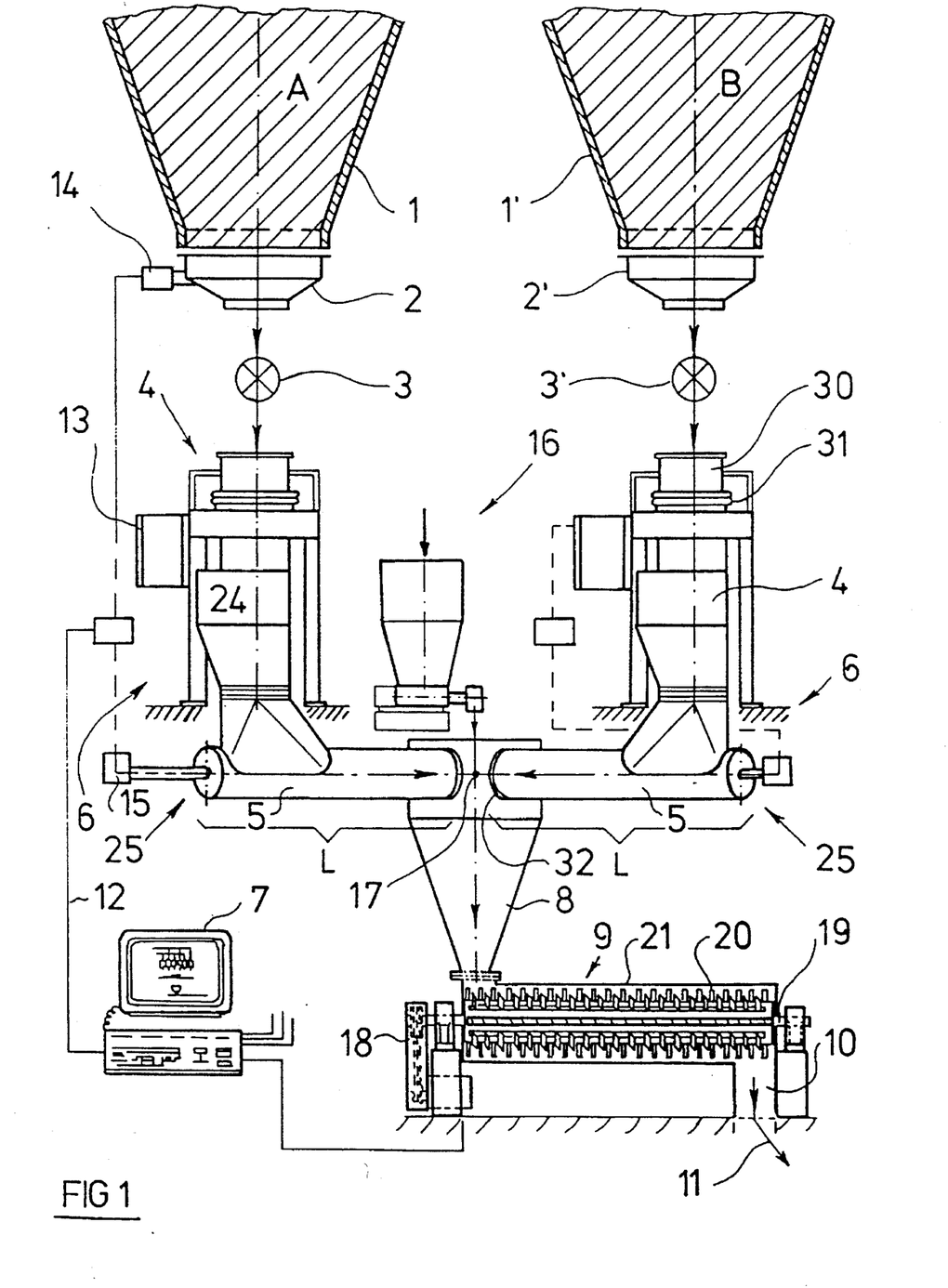
FIG. 1 shows a schematic overview of the new continuous mixing and homogenizing plant.
Figure 2:
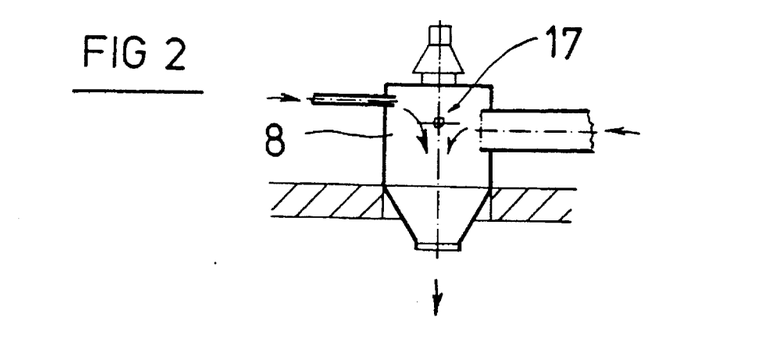
FIG. 2 shows a pre-mixing space.
Figure 3:
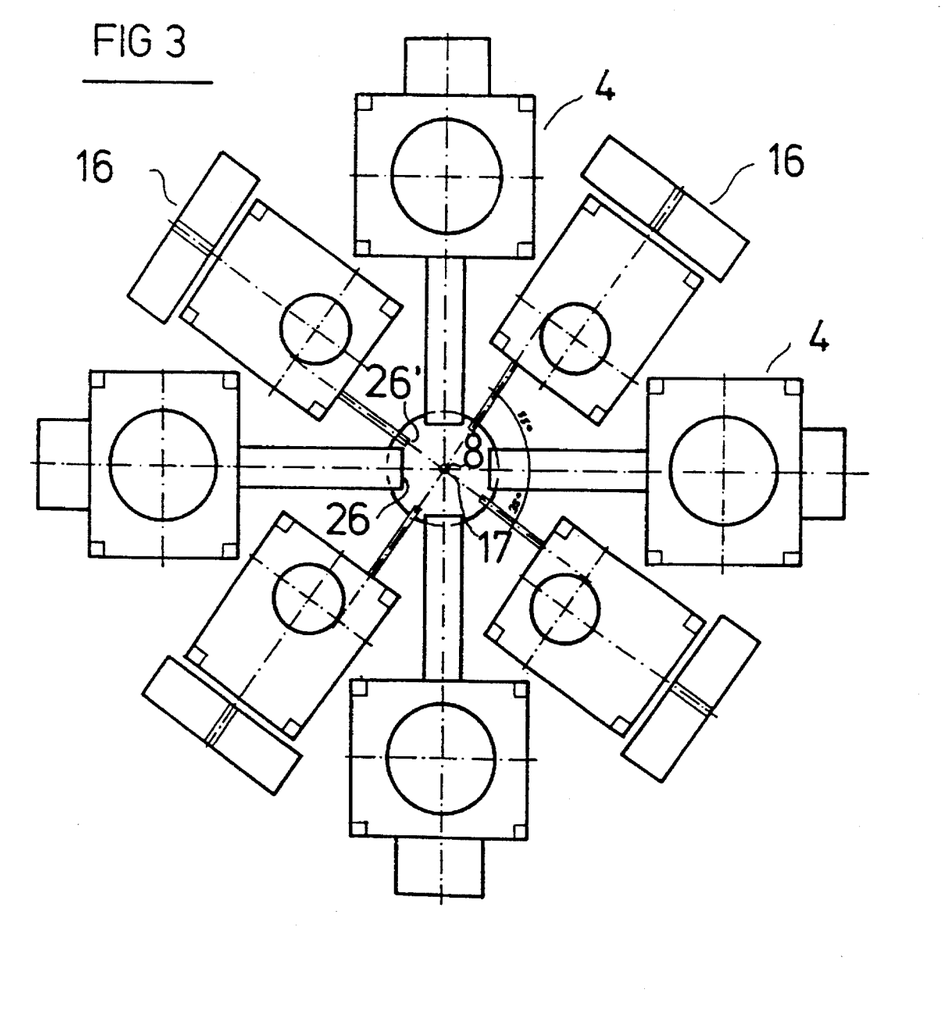
FIG. 3 shows an outline for the circular arrangement of component metering weighers relative to the pre-mixing space.

FIGS. 1, 2 and 3 are referred to in the following. A raw material A is fed from a component cell 1 via a discharge apparatus 2 and a screw conveyor or pocket wheel 3 into a component metering weigher 4. The component metering weigher 4, together with a tube screw conveyor 5, forms a differential flow regulator 6. A raw material B is discharged from a second component cell 1', a discharge apparatus 2' and a conveyor screw 3' and given in a metered manner to a second component metering weigher 4 or a corresponding differential flow regulator 6. The weight amounts which are predetermined by a control unit 7 are directed simultaneously by the two differential flow regulators 6 into a pre-mixing space 8 and directly into a homogenizer 9 and conveyed for further processing (arrow 11) via an outlet spout 10. As can be seen in FIGS. 1, 2 and 3, the outlets 26, 26' etc. of the component metering weighers 4 are arranged at identical distances from a collecting point 17. The entire product flow is controlled by the control unit 7. The corresponding signals are transmitted to all corresponding plant elements by the control unit 7 or mixer computer 7, respectively. In particular, each of the component metering weighers 4 receives an exact metering command via a control line 12. On-site electronics 13 transmits the required signals, e.g. to the feed apparatus 2/3 or 2'/3' respectively, and correspondingly switches a vibrator 14/14' on or off, respectively. Another signal is likewise fed to a drive unit 15 of the tube screw conveyor 5 in order to predetermine a volumetric reference metering output for the start by means of the rate of rotation, which reference metering output is then replaced at the end of the volumetric metering by a weight value per time unit by means of the differential weighing and is regulated correspondingly according to a predetermined mixing composition or recipe.

In many cases of application, one or more additives are added to the mixture of two or more basic components, e.g. two types of flour, but in very small proportions. Special micro-differential metering weighers 16, known per se, are used for this purpose. If only one micro-differential metering weigher 16 is required, it can be arranged directly above the pre-mixing space 8. All described raw components are accordingly guided together to an (imaginary) collecting point 17 and flow directly into the homogenizer 9. The homogenizer 9 comprises a drive 18 which drives a paddle shaft 19 at relatively high circumferential speed in such a way that an intensive whirling occurs from a great number of paddles 20 inside a closed tubular housing 21.

As can further be seen in FIG. 1, the differential flow regulator 6 is connected, as a constructional unit, with a stationary product feed 30 via a flexible sleeve 31 and is likewise connected at the outlet end of the tube screw conveyor 5 with the stationary collecting hopper 8 via a rubber sleeve 32. The required measuring elements, known per se, for the weight values or weight value receivers are not shown.

In principle, the component metering weigher 4 cooperates with the feed element 3 and the tube screw conveyor 5 as well as with the corresponding control means as differential flow regulator 6. If a product quantity has reached a selectable filling height in the component metering weigher 4, the feed of additional product via the feed element 3 is stopped via a corresponding weigher signal. The actual weight per product quantity in the weighing vessel 24 can be determined at least when starting the plant after a short calming period in the weigher and the product discharge can commence by means of switching on the drive unit 15. If corresponding numerical values are stored in the control unit 7 the desired output can be discharged by means of setting a determined speed of the tube screw conveyor 5. The metering output determined by this is a function of the speed and volumetric efficiency of the tube screw conveyor 5. This means that the metering accuracy brought about by the volumetric metering is not as good as that of the differential weight measurement. A reduction in weight is determined in the component metering weigher 4 already with small discharge quantities. The weight reduction per time unit allows a changeover into the gravimetric determination of the discharged material. The change in speed of the tube screw conveyor 5, which is necessary in any case, can be corrected via the drive unit 15 almost without a delay in time with the more precise gravimetric measurement value. In principle, the conveying path between the outlet 26 (FIG. 3) of the tube screw conveyor 5 or a corresponding second outlet 26' of every additional component metering weigher 4, respectively, until the convergence of the individual partial flows is identical. After a certain metering time interval, the contents in the weighing vessel 24 have sunk to a lower filling level. At this value, which is assumed as lower filling quantity, a signal is given once again for actuating the feed element 3 and the weighing vessel 24 is refilled. During the filling, the weight signal may not be used for the metering output of the tube screw conveyor 5. However, a corresponding stored or predetermined value or a speed assigned to the metering output, respectively, can be maintained or the last measured speed of the discharge screw conveyor can be kept constant during the filling period. The plant is particularly suited preferably for the mixing of flour-like materials, particularly in mills, feedstuff mills, bakeries or e.g. also the preparation of materials in pasta factories, at least the components which are free-flowing to some degree. But additional liquid components can also be mixed in in the area of the homogenizer 9 with an appropriate construction design.

Figure 4:
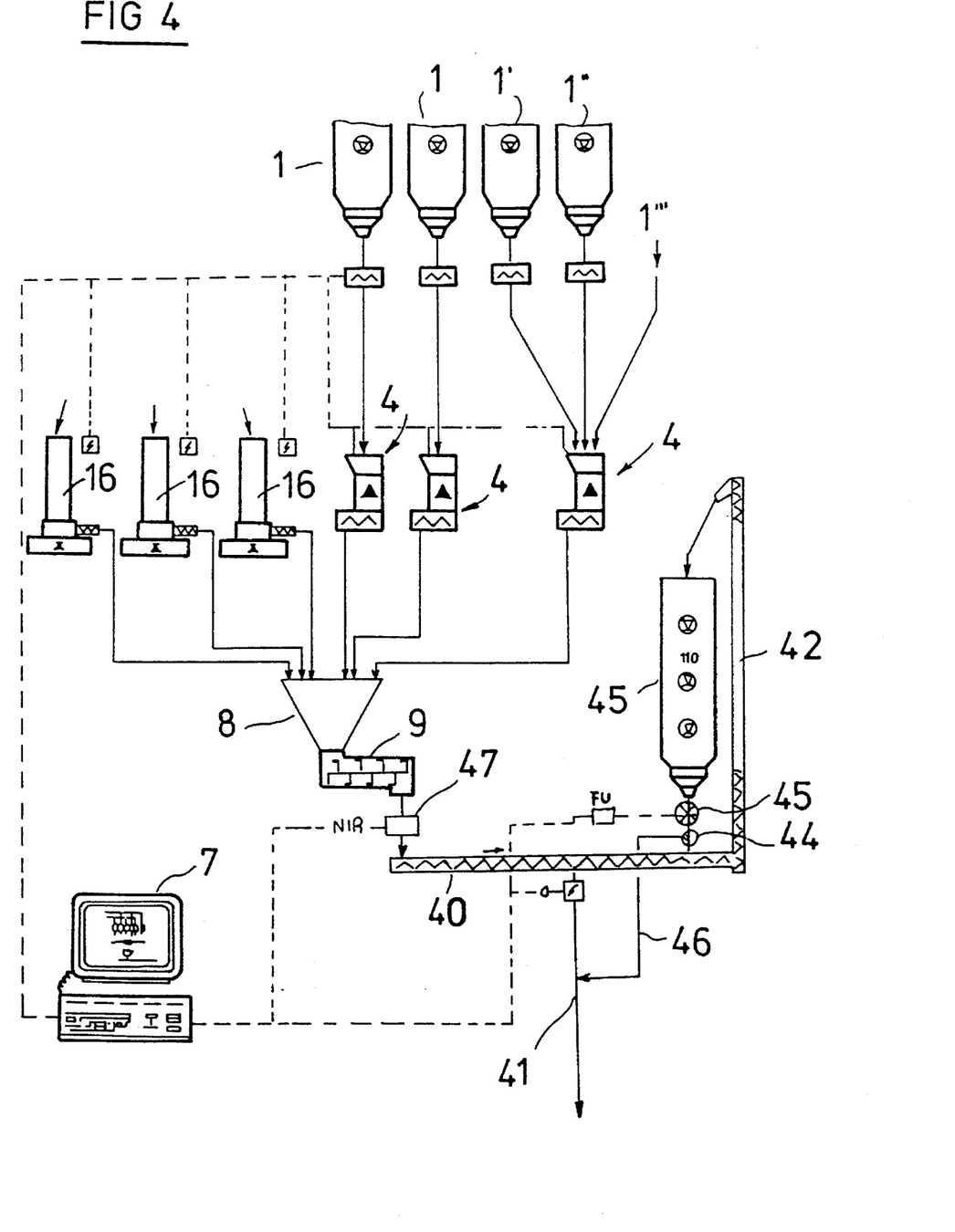
FIG. 4 shows an embodiment form with the additional use of a product station.

FIG. 4 shows a similar construction in a more schematic manner than in FIG. 1. The product is fed into a pre-mixing space 8 and from the latter directly into a continuous homogenizer 9 via the force of gravity. This solution is for simple mixing tasks. The homogenizer 9 is shown in a correspondingly simplified manner. An NIR measuring and monitoring device 47 is arranged at the product outlet of the homogenizer 9, the product is then fed to a product discharge line 41 via a horizontal screw 40. In this construction, the first runnings which are insufficiently homogenized can be delivered, via a second vertical screw 42, to a product station 43 from which they are directed in turn, via a metering lock 45 and a diverter or line-switch 44, to the product discharge line 41 in the smallest quantities via an inlet tube 46. However, it is also possible to homogenize the product in the product station itself by means of repeated circular conveying in that it is returned to the horizontal screw 40 and vertical screw 42 from the line-switch 44. As in FIG. 1, all monitoring, control and regulating tasks can likewise be effected in this case via a PC or mixer, computer 7.

The quality of mixing in the continuous method also depends on the homogeneity of the individual raw components. For this reason, FIG. 4 shows a possibility for the homogenization of different raw components. A plurality of raw components of the same kind are combined in groups and fed to a differential throughflow regulator in respective proportions e.g. of 25%, 33% and 50%. However, every proportion need only be fed within an accuracy of +/− 5% in each instance. This means that inexpensive discharge elements, e.g. rotary locks, with preselectable discharge speeds can be used among the corresponding silo cells 1', 1'', 1''' with raw components of the same kind However, the blend of the group is in turn determined with weighing accuracy via component metering weigher 16' and controlled in the corresponding direction to the other component metering weighers 16.

Figure 5:
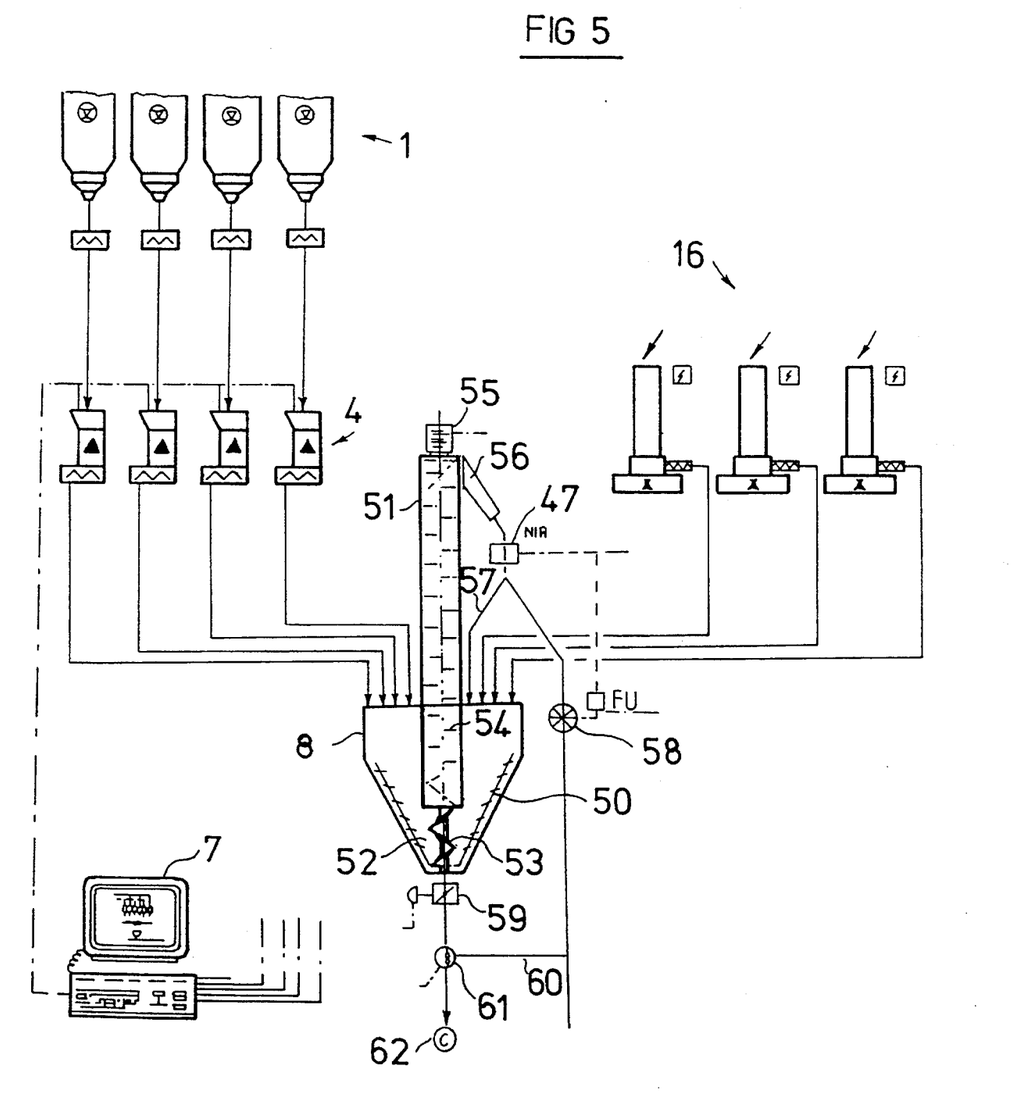
FIG. 5 shows a mechanical pre-mixer homogenizer.

FIG. 5 shows a particularly advantageous construction, wherein the pre-mixing space 8 is designed as a combinatorial unit with the homogenizer 9. Additional simple mixing tools 50 which can have a form which is known per se are arranged in the pre-mixing space 8 in FIG. 5. It is important that, in this case also, all product proportions enter the pre-mixing space 8 simultaneously and with weighing accuracy in correct combination, so that a good mixing takes place. The actual homogenization, that is, the uniform fine distribution of all components is effected in the mechanical whirl homogenizer 51. In the hopper portion 52, a feed screw 53 conveys the entering product into the whirl homogenizer 51 which is outfitted with homogenizing paddles 54. This whirl homogenizer 51 is set in rotation by a drive motor 55 whose rotating direction can be reversed. In so doing, the mixing tools 50 can be set in rotation by the same drive. The product is first directed from an overflow 56 via a NIR measuring and monitoring device 47, from where it either flows back into the pre-mixing space 8 via a return line 57 or is fed via a discharge lock 58 to a further destination. In very simple cases, e.g. for mixing together two flours, the material to be mixed is discharged directly from the pre-mixing space 8 via a controllable base flap 59 and transferred via a conveyor 60 to the same destination as it is from the discharge lock 58. In the converse case, first runnings and/or residual quantities can likewise be transferred for residues processing 62 via the base flaps 59 and line-switch 61 with particularly strict demands on homogeneity.

Figure 6:
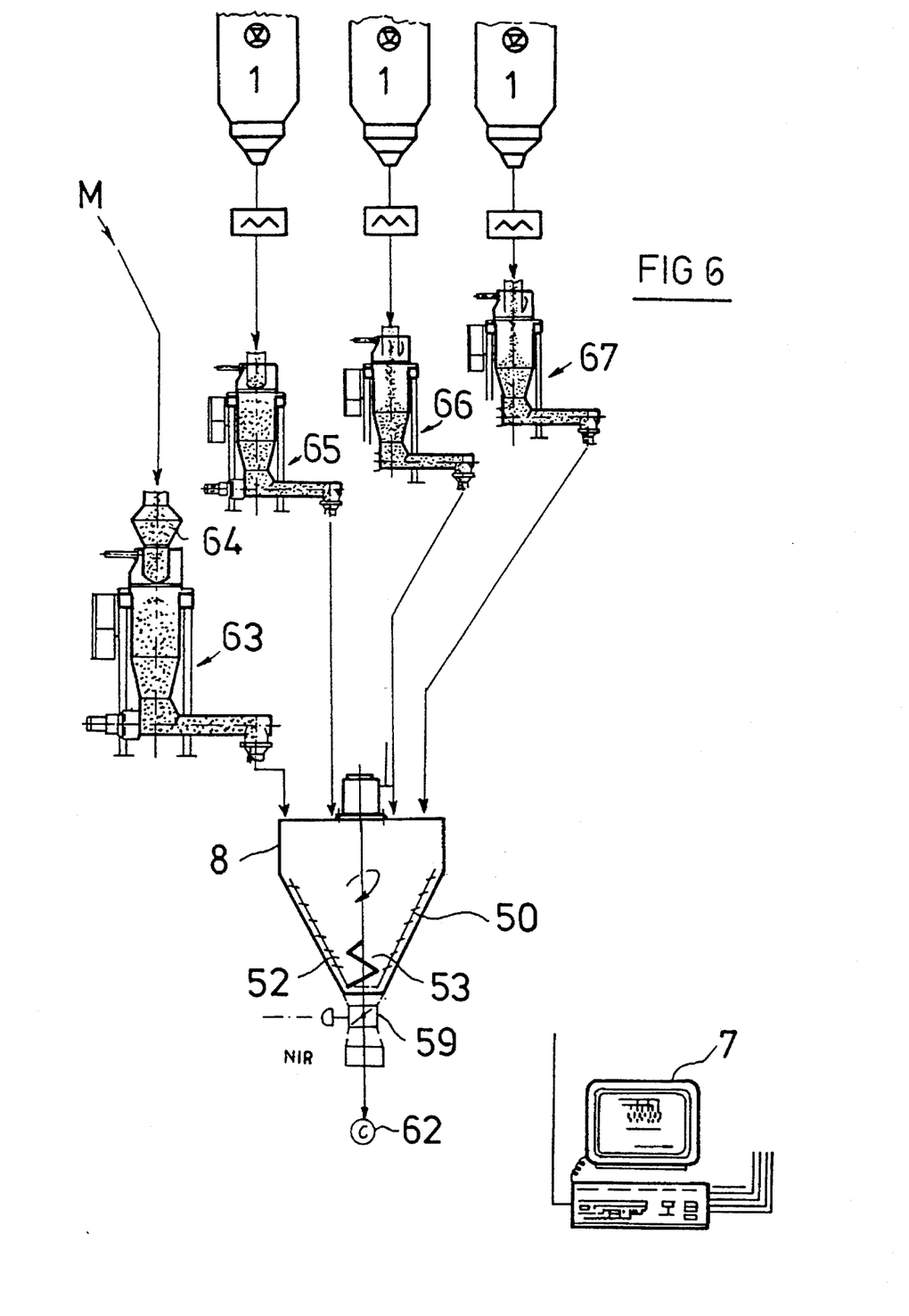
FIG. 6 shows a simplified pre-mixer homogenizer.

Reference is made in the following to FIG. 6 which shows, in part, a simplified embodiment form of FIG. 5. In particular, the collecting hopper 8 is formed by a simple combined pre-mixing space and homogenizer in which corresponding homogenizing tools, which can also be supplemented by liquid means (e.g. as in FIG. 7), are arranged. This type of construction can always be used when e.g. only different flours need to be mixed and homogenized, that is, when no minimal components need be added.

Another particularly advantageous construction is shown in FIG. 6 in that it is possible for the first time to guide the main product continuously produced by the mill, e.g. baking flour or pasta semolina, directly via a first master weigher 63. The master weigher 63 measures the continuous product flow M of the mill and directs it directly into the pre-mixing space 8. A small pre-station 64 prior to the differential weigher takes over the build-up of material in the gravimetric measuring phase. All the rest of the components can now be delivered and homogenized in the desired proportion percents based on a predetermined recipe and the instantaneous weight signals of the master weigher 63 with a dependent metering weigher 65, 66, 67 etc. via a corresponding control unit similar to FIGS. 4 and 5, but so as to be continuously corrected with respect to weight.

But it is accordingly possible for the first time also to produce homogeneous flour mixtures in continuous operation according to the working process in the mill, which is continuous per se, without corresponding intermediate storage, which constitutes a great advance with all products which do not need storage with respect to product quality.

Figure 6A:
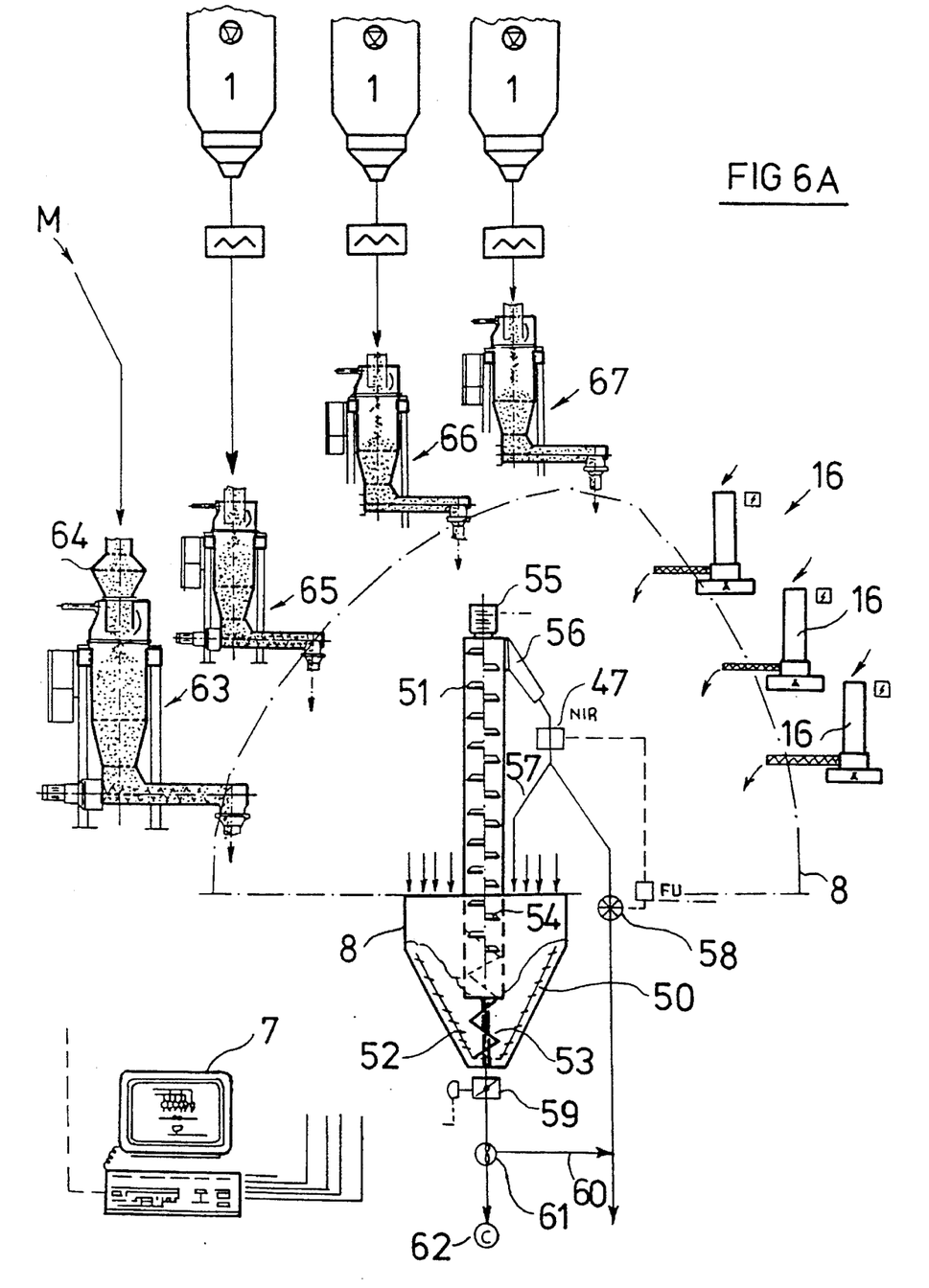
FIG. 6a shows the same arrangement as in FIG. 6, but for the strictest demands with respect to homogeneity.

FIG. 6a shows another construction of FIG. 6. All advantages, e.g. of FIG. 5 as well as FIG. 6, that is, for the strictest demands with respect to the homogeneity, even with the minimal components, can be fulfilled. A geometrically similar arrangement of all differential metering devices relative to the pre-mixing space 8 is symbolized by 8', e.g. corresponding to FIGS. 1 to 3.

Figure 7:
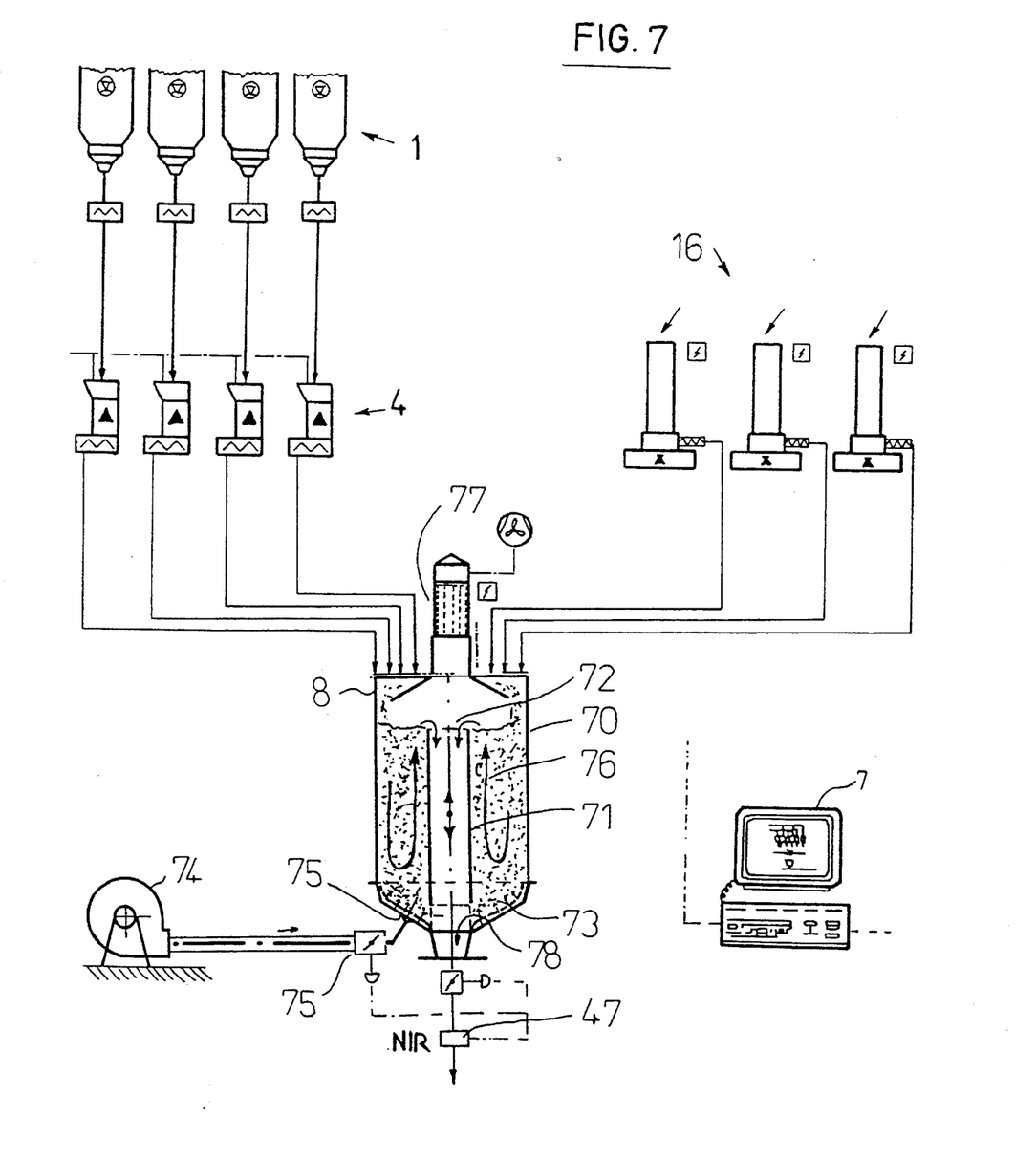
FIG. 7 shows a pneumatic homogenizer.

FIG. 7 is an alternative to FIGS. 5 and 6. The pre-mixing space 8 and homogenizer 9 are combined to form a pneumatic homogenizer 70 in this instance. The product feed can be effected in the same manner as in FIG. 5. In normal operation, all product proportions are fed into the pre-mixing space 8 until reaching the level of the overflow 72 of a mixing tube 71. At the same time, air is blown in via a double-base 73 with porous plate by a blower 74 by means of an adjustable air throttle 75. An outstanding homogeneity, particularly for mill products, can be achieved with dry air in that the individual components are fed in more at the periphery, but the material to be mixed, which is homogenized by means of liquefaction and intensive whirling, flows toward the center (arrow 76) and the air is likewise sucked out in the center via an air exhaust 77. The outlet area of the pneumatic homogenizer 70 is constructed in such a way that e.g. the proportion at the base outlet 78 is controllable by means of raising and lowering the mixing tube 71, which is also particularly useful for emptying residue.

The invention further allows a great number of other novel combination possibilities, only some of which are shown in the drawings. All constructions of FIGS. 4 to 7 which are shown schematically are preferably constructed in a manner corresponding to FIGS. 1, 2 and 3 with respect to the arrangement.

While the foregoing description and drawings represent the preferred embodiments of the present invention, it will be obvious to those skilled in the art that various changes and modifications may be made therein without departing from the true spirit and scope of the present invention.

What is claimed is:

1. A plant for continuously and accurately mixing and homogenizing pourable foodstuff materials comprising:

a plurality of stationary product feed devices for feeding foodstuff materials;

a like plurality of differential flow regulators each operatively connected to a respective product feed device, each differential flow regulator comprising:
  (i) a stationary feed element;
  (ii) a weighing container connected to the stationary feed element by a flexible sleeve for receiving foodstuff material from the feed element; and
  (iii) conveyor means fixedly attached to the weighing container and having a conveyor exit for outputting foodstuff material from the weighing container, wherein each of the conveyor means for the plurality of flow regulators has a length that is substantially identical;

collection means including a pre-mixing container for receiving and pre-mixing the outputted foodstuff materials from each of the plurality of conveyor means, said pre-mixing container having a plurality of openings, each opening connected to a respective conveyor means exit by a flexible sleeve, said openings having respective axes arrayed on a common horizontal plane and oriented along each corresponding conveyor means and toward a common collection point in said horizontal plane within said pre-mixing container;

a homogenizer for receiving and final mixing the pre-mixed foodstuff materials from said pre-mixing container; and control means operatively connected to said homogenizing means and to each of said feed elements and said conveyor means.

2. The plant as in claim 2, further including at least one micro-differential weigher operatively connected to discharge metered amounts of another material to said pre-mixing container.

3. The plant as in claim 2, wherein said pre-mixing container includes an inlet for receiving the metered another material from said at least one micro-differential weigher, wherein said inlet has an axis oriented toward said common collection point.

4. The plant as in claim 3, having only one micro-differential weigher, said inlet being positioned substantially vertically above said common collection point.

5. The plant as in claim 2, wherein said plurality of differential flow regulators are located on a circle about said pre-mixing container, and wherein said at least one micro-differential weigher is located inboard of said circle.

* * * * *

UNITED STATES PATENT AND TRADEMARK OFFICE
CERTIFICATE OF CORRECTION

PATENT NO. : 5,527,107
DATED : June 18, 1996
INVENTOR(S) : WEIBEL et al.

It is certified that error appears in the above-indentified patent and that said Letters Patent is hereby corrected as shown below:

On the title page, item [54],
In the Title, line 2, "HOMGENIZATION" should read

--HOMOGENIZATION--.

Claim 2, col. 10, line 1, "claim 2" should read --claim 1--.

Signed and Sealed this

Third Day of September, 1996

BRUCE LEHMAN

Attest:

Attesting Officer      Commissioner of Patents and Trademarks